(12) United States Patent
Tzori

(10) Patent No.: US 10,019,171 B2
(45) Date of Patent: Jul. 10, 2018

(54) SYSTEMS AND METHODS FOR DECOUPLING HOST COMMANDS IN A NON-VOLATILE MEMORY SYSTEM

(71) Applicant: SanDisk Technologies Inc., Plano, TX (US)

(72) Inventor: Yiftach Tzori, Michamanim (IL)

(73) Assignee: Sandisk Technologies LLC, Plano, TX (US)

( * ) Notice: Subject to any disclaimer, the term of this patent is extended or adjusted under 35 U.S.C. 154(b) by 0 days.

(21) Appl. No.: 15/088,596

(22) Filed: Apr. 1, 2016

(65) Prior Publication Data

US 2017/0249081 A1     Aug. 31, 2017

(51) Int. Cl.
| | |
|---|---|
| *G06F 17/00* | (2006.01) |
| *G06F 12/08* | (2016.01) |
| *G06F 12/0808* | (2016.01) |
| *G06F 12/0815* | (2016.01) |
| *G06F 3/06* | (2006.01) |

(52) U.S. Cl.
CPC ............ *G06F 3/061* (2013.01); *G06F 3/0659* (2013.01); *G06F 3/0688* (2013.01)

(58) Field of Classification Search
CPC ...... G06F 3/0641; G06F 3/0659; G06F 12/00; G06F 12/02; G06F 12/08
USPC ......................................................... 711/103
See application file for complete search history.

(56) References Cited

U.S. PATENT DOCUMENTS

| 8,255,618 | B1* | 8/2012 | Borchers | G06F 13/1642 710/21 |
|---|---|---|---|---|
| 9,223,511 | B2* | 12/2015 | Rudelic | G06F 3/0641 |
| 2012/0311231 | A1* | 12/2012 | Porterfield | G11C 16/06 711/103 |
| 2013/0198416 | A1* | 8/2013 | Zhu | G06F 3/0659 710/6 |
| 2013/0262761 | A1* | 10/2013 | Oh | G06F 3/0659 711/114 |
| 2016/0328156 | A1* | 11/2016 | Swarbrick | G06F 13/4234 |

* cited by examiner

*Primary Examiner* — Tuan Thai
*Assistant Examiner* — Mohamed Gebril
(74) *Attorney, Agent, or Firm* — Brinks Gilson & Lione

(57) ABSTRACT

Systems and methods for decoupling host commands in a non-volatile memory system are disclosed. In one implementation, a non-volatile memory system includes a non-volatile memory and a controller in communication with the non-volatile memory. The controller is configured to translate a first command that is formatted according to a communication protocol to a second command that is formatted generically, store the first command in an expected queue, and store the second command in the expected queue with a command priority. The controller is further configured to execute the second command based on the command priority, translate a result of the executed second command into a format according to the communication protocol, and transmit the result of the executed second command in the format according to the communication protocol to a host system dependent upon a position of the first command in the expected queue.

18 Claims, 6 Drawing Sheets

SYSTEMS AND METHODS FOR DECOUPLING HOST COMMANDS IN A NON-VOLATILE MEMORY SYSTEM

BACKGROUND

As communication protocols in non-volatile memory systems have advanced, an interface communication channel between a host system and a memory system coupled to the host system have evolved to support more complex functionality than mere data transmission to and from the host system and the memory system.

Issues may arise when a host system prompts a memory system to perform functions that the memory system may not be able to physically support or that may degrade a performance of the memory system. Issues may also arise when a host system has the ability to request the same functionality in different ways.

Improved memory systems are desirable that are able to better support advanced communication protocols.

DETAILED DESCRIPTION

Figure 1:
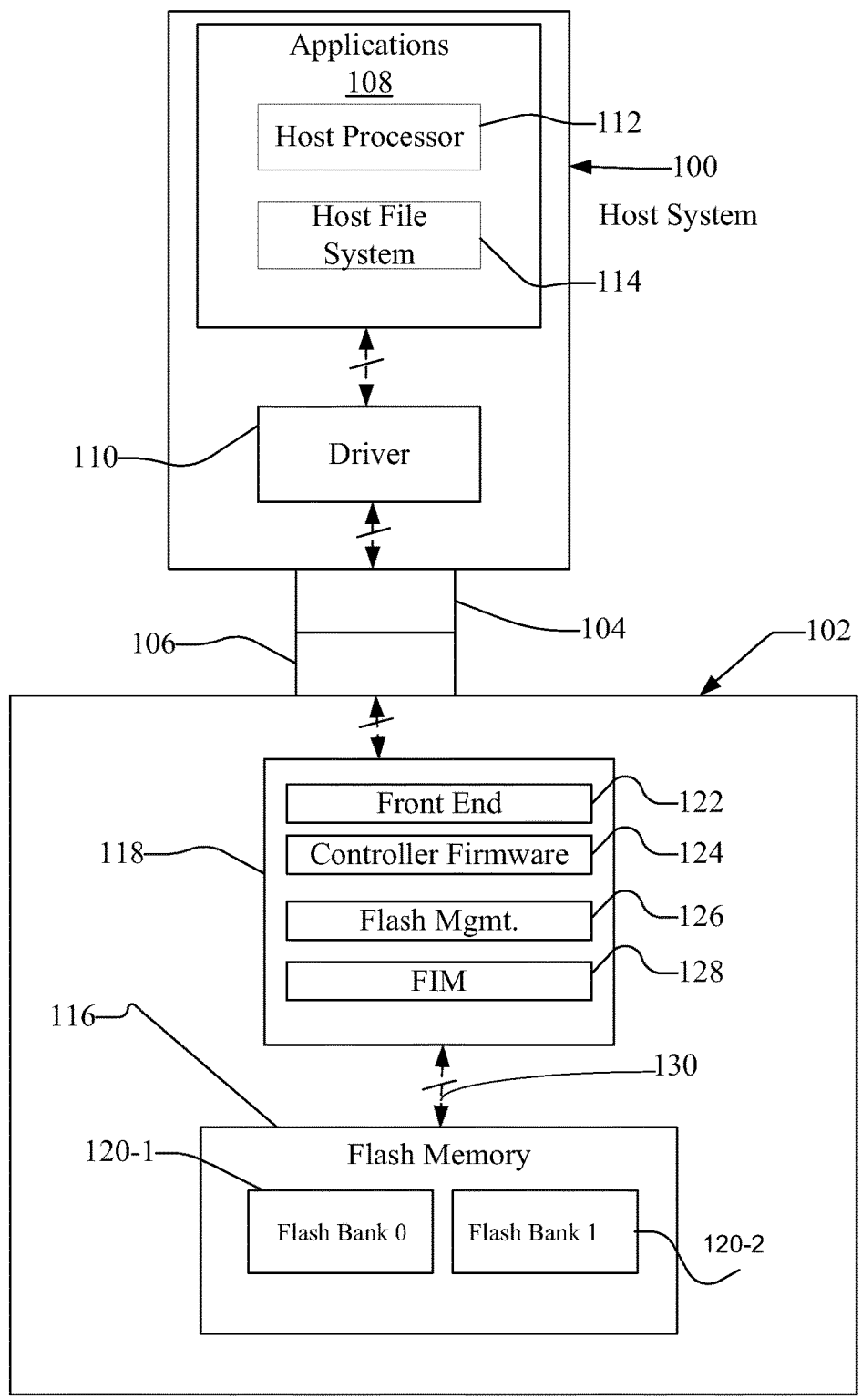
FIG. 1 illustrates a host system connected with a non-volatile memory device.

The present disclosure is directed to systems and methods for decoupling host commands in a non-volatile memory system.

Multi-function host systems including tablet computers and smartphones allow users to perform several tasks like taking photographs with built-in cameras, playing back stored music, saving and editing data files etc. These activities require ever increasing amounts of non-volatile memory. As a result, communication protocols used to communicate information between host systems and non-volatile memory systems have evolved to improve the communication efficiency and bandwidth requirements.

For example, communication protocols may provide the ability for host systems to communicate with non-volatile memory systems using complex commands that have increased capabilities when compared to conventional commands. Because the host system is able to provide complex commands that request multiple processes at the memory system at one time, the host is free to perform other actions, thereby saving time and power. When the non-volatile memory system receives the complex commands using advanced communication protocols, it is desirable for the memory systems to decouple the host commands and translate the host commands into more simplistic memory commands that the memory system can more easily execute.

In one aspect of the present disclosure, a method is disclosed. In the method, a controller of a non-volatile memory system receives, from a host system coupled to the non-volatile memory system, a host command. The controller translates the host command into a memory command and determines a command priority in an expected queue for the memory command. The controller selects the memory command for execution based on the command priority, translates a result of the executed memory command into a formatted host command result based on a format of the host command, and transmits the formatted host command result to the host system.

In an additional aspect of the present disclosure, a non-volatile memory system is disclosed. The non-volatile memory system includes a non-volatile memory and a controller in communication with the non-volatile memory.

The controller is configured to translate a first command that is formatted according to a communication protocol to a second command that is formatted generically, store the first command in an expected queue, and store the second command in the expected queue with a command priority. The controller is further configured to select the second command for execution based on the command priority, translate a result of the executed second command into a format according to the communication protocol, and transmit the result of the executed second command in the format according to the communication protocol to a host system dependent upon a position of the first command in the expected queue.

In a further aspect of the present disclosure, an additional method is disclosed. In the method a controller of a non-volatile memory system receives, from a host system coupled to the non-volatile memory system, a host command. The controller translates the host command into at least a first memory command and a second memory command. The controller determines a command priority in a first expected queue of a plurality of expected queues for the first memory command and determines a command priority in the first expected queue for the second memory command.

The controller selects the first memory command for execution based on a priority of the first expected queue and the command priority of the first memory command, and selects the second memory command for execution based on the priority of the first expected queue and the command priority of the second memory command. The controller translates a result of an execution of the first memory command and an execution of the second memory command into a formatted host command based on a format of the host command, and transmitting the formatted host command to the host system.

Other embodiments and forms are possible, and each of the embodiments and forms can be used alone or together in combination. Accordingly, various embodiments and forms will be described with reference to the attached drawings.

A system suitable for use in implementing aspects of the disclosure is shown in FIG. 1. A host system 100 of FIG. 1 stores data into and retrieves data from a storage non-volatile memory system 102. The non-volatile memory system 102 may be memory embedded within the host system 100 such as in the form of a solid state disk (SSD) drive installed in a personal computer. Alternatively, the non-volatile memory system 102 may be in the form of a card that is removably connected to the host 100 through mating parts 104 and 106 of a mechanical and electrical connector as illustrated in FIG. 1. A non-volatile memory system configured for use as an internal or embedded SSD drive may look similar to the schematic of FIG. 1, with the primary difference being the location of the non-volatile memory system 102 internal to the host system 100. SSD drives may be in the form of discrete modules that are drop-in replacements for rotating magnetic disk drives.

Host systems that may use SSDs, memory cards and flash drives are many and varied. They include personal computers (PCs), such as desktop or laptop and other portable computers, tablet computers, cellular telephones, smartphones, personal digital assistants (PDAs), digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip.

Host systems 100 may communicate with non-volatile memory systems 102 via an electrical communication path formed by the mating parts 104 and 106. Communication may include commands and data instructing the storage device 102 to perform functions including reading data, writing data etc. Mating parts 104 and 106 may electrically and mechanically conform to a standard. Exemplary standards include Universal Serial Bus (USB), Small Computer System Interface (SCSI), Serial ATA (SATA), Universal Flash Storage (UFS), Secure Digital (SD), Memory Stick (MS) etc. Each of these standards specifies the format for the commands and data and the communication protocol to be employed for communicating the formatted commands and data. For example, the standard may include specific header and trailer information that may encapsulate the commands and data and the communication protocol may specify the electrical signaling for communicating the formatted commands and data.

The host system 100 of FIG. 1 may be viewed as having two major parts, insofar as the non-volatile memory system 102 is concerned, made up of a combination of circuitry and software. They are an applications portion 108 and a driver portion 110. In some forms, the driver portions 110 may directly interface with the non-volatile memory system 102, wherein in other forms, the driver portions 100 may communication with other standardized hardware within the host, which in turn communicates with the non-volatile memory system 102.

In a PC, for example, the applications portion 108 can include a host processor 112 running word processing, graphics, control or other popular application software, as well as the file system 114 for managing data on the host system 100. In a camera, cellular telephone or other host system that is primarily dedicated to performing a single set of functions, the applications portion 108 includes the software that operates the camera to take and store pictures, the cellular telephone to make and receive calls, and the like.

The non-volatile memory system 102 of FIG. 1 may include non-volatile memory, such as flash memory 116, and a memory controller 118 that interfaces with both the host system 100 to which the non-volatile memory system 102 is connected for passing data back and forth and controls the memory 116. The memory controller 118 may convert between logical addresses of data used by the host system 100 and physical addresses of the flash memory 116 during data programming and reading. The flash memory 116 may include any number of flash memory banks 120 and two flash memory banks 120-1 120-2 are shown in FIG. 1 simply by way of illustration. By way of example and without limitation the term flash memory bank is used to describe 120-1 120-2. However, 120-1 120-2 may also correspond to flash dies in the same package. Functionally, the memory controller 118 may include a front end 122 that interfaces with the host system 100, controller logic 124 for coordinating operation of the memory 116, flash management logic 126 for internal memory management operations such as garbage collection, and one or more multi-threaded flash interface modules (FIMs) 128 to provide a communication interface between the controller with the flash memory 116.

In some forms, the driver 110 of host system 100 and the front end 122 of the non-volatile memory system 102 operate in accordance with the standard used to communicate commands and data across mating parts 104 and 106. For example, driver 110 may format a write command received from any one of the applications 108 to conform to the standard and cause the transmission of signals corresponding to the formatted data in accordance with the communication protocol via the electrical connectors of mating parts 104 and 106. In response to receiving the transmitted signals, front end 122 may interpret the formatted received command and extract the command and data. The extracted command and data may be communicated to FIM 128. FIM 128 may translate the commands to commands that may be deciphered and acted upon by flash memory 116.

Although the mechanism for exchanging data and commands is standard and communication protocol specific, internally the non-volatile memory system 102 may operate in a proprietary fashion. The internal functions may be optimized based on the architecture of the non-volatile memory system 102. In an exemplary embodiment, memory controller 118 may include an abstraction mechanism that separates the protocol specific aspects of the communication protocol from the internal operational mechanisms of the storage device 102.

Figure 2:
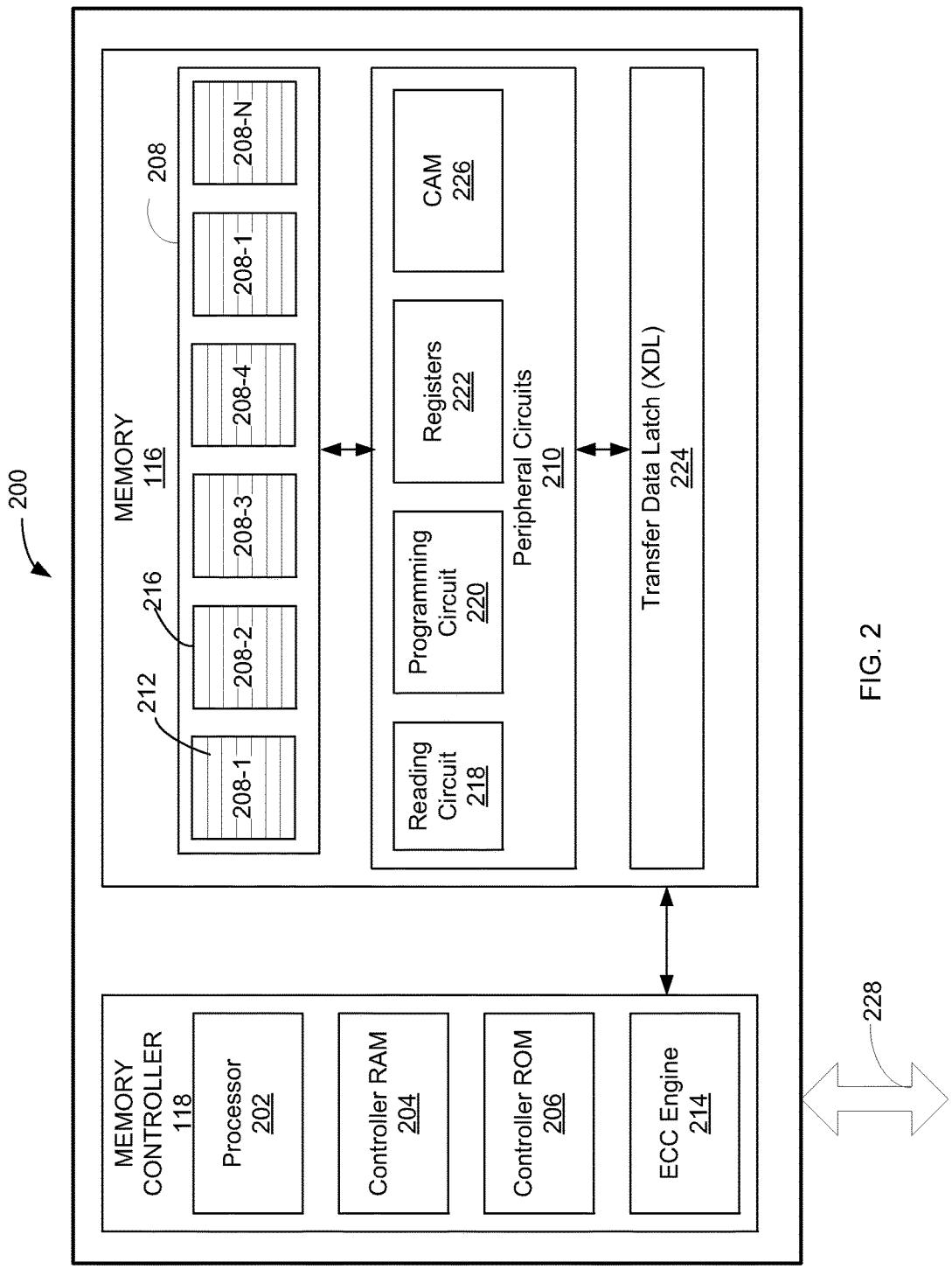
FIG. 2 is a block diagram of a memory controller.

FIG. 2 is a detailed block diagram of an example non-volatile memory system 200. In some forms, the example non-volatile memory system 200 may correspond to the non-volatile memory system 102 of FIG. 1. The non-volatile memory system 200 may comprise a memory controller 118 and memory 116. The memory controller 118 may be implemented on a single integrated circuit chip, such as an application specific integrated circuit (ASIC).

By way of example and without limitation, in some forms, memory controller 118 includes a processor 202, controller RAM 204, controller ROM 206 and error correcting code (ECC) engine 214. The processor 202 may comprise a microprocessor, a microcontroller, an application specific integrated circuit (ASIC), a field programmable gate array, a logical digital circuit, or other now known or later developed logical processing capability.

Controller ROM 206 may store software instructions that processor 202 may execute to control the operation of storage device 102. Controller ROM 206 may also include software instructions that when executed by processor 202 effectuate the verification of data corresponding to configuration parameters and the recovery of corrupt data corresponding to configuration parameters stored in memory 116. Controller ROM 206 may be used to store instructions corresponding to the basic input output system (BIOS). The instructions of the BIOS when executed by processor 202 may cause the initialization and testing of the memory system 200 components and cause the processor 202 to search for and load a boot code or an operating system stored in memory 116.

Examples of controller ROM 204 include electrically erasable programmable read only memory (EEPROM), NOR flash memory etc. A characteristic of controller ROM 204 is that it can be read and written on a byte by byte or word by word basis.

Generally, boot code is program code that, when executed, loads the main operating system or runtime environment from the memory 116 to RAM 204 and initiates the execution of the main operating system. Boot code may also include instructions that when executed by processor 202 cause initialization of hardware components of the memory system 200. On successful loading of the operating system, the memory system 200 is available to receive commands from the host system 100 to read and write information to memory 116.

ECC engine 214 is configured to compute an ECC for a set of binary data. The computed ECC may be appended to the data before it is stored in memory 116. The ECC engine 214 may utilize the stored ECC to identify and correct errors in the data at a later point in time.

In an exemplary form, memory 116 includes non-volatile memory 208, peripheral circuits 210 and a transfer data latch (XDL) 224. In a preferred embodiment, non-volatile memory 208 comprises NAND flash memory. In this embodiment, non-volatile memory 208 is organized as N memory blocks 208-1 to 208-N. A memory block is organized as a set of memory pages or simply pages, memory page 212 for example. In this embodiment, a memory page is a smallest unit of writing in the memory 108 and a memory block is the smallest unit of erasing. Thus, In contrast to controller ROM 204 which may be read and written to on a byte by byte basis, data is typically programmed or stored in NAND flash memory on a page by page basis. However, erasing data programmed in a page requires erasure of all the pages in the memory block.

Each memory page consists of a set of single-level memory cells (SLC) or multi-level memory cells (MLC). A memory cell discussed with reference to FIG. 2 may correspond to a storage unit discussed with reference to FIG. 1. A SLC memory can store a single bit of data per cell. MLC memory can store multiple bits of data per cell. For example, two-level MLC memory can store 2 bits of data per cell, three level MLC memory can store 3 bits of data per cell and N level MLC memory can store N bits of data per cell. Typical sizes of memory pages are 512 bytes, 4 Kilobytes and 16 Kilobytes (Kbytes). A memory block typically consists of hundreds of memory pages. In describing exemplary embodiments herein, the term "cell" is used to refer to both SLC and MLC. A memory cell can be in an erased state or a programmed state. A memory page with memory cells in an erased state may be referred to as an erased memory page. Data received from the host system 100 is typically programmed or stored in an erased memory page.

Both types of cells (SLC and MLC) store data by storing electric charge (charge). The amount of electric charge stored in a cell is representative of the data bit(s) stored in the cell. For example, in case of an erased SLC, no charge or an infinitesimal amount of electric charge is stored in the SLC and this uncharged state represents a bit value of 0. In contrast, a predefined amount of electric charge stored in an SLC, represents the bit value of 1. In the case of an N-level MLC, $2^N$ different predefined amounts of charge may be stored to represent one of N values. For example, a three-level MLC is configured to store any one of eight amounts of electric charge values ($2^3=8$) and correspondingly any one of eight possible binary values, 000 to 111. The number of different bits of data that may be stored in a memory cell may be referred to as the density of the memory cell. Thus a 3-level, or 3 bits per cell MLC is denser than a 2-level, or 2 bits per cell MLC and so on.

Peripheral circuits 210 may include electronic componentry such as analog to digital convertors (ADC), digital to analog convertors (DAC), charge pumps, amplifiers, level shifters etc. By way of example and without limitation, in an embodiment, the electronic componentry may be functionally and logically categorized as programming circuit 220, reading circuit 218, registers 222 and content addressable memory (CAM) 226.

In an embodiment, the reading circuit 218 of FIG. 2 translates the amount of charge stored in a memory cell to a binary representation of the data corresponding to the amount of charge stored in the cell. By way of example and without limitation, the reading circuit 218 may include current to voltage convertors, amplifiers and analog to digital convertors.

The programming circuit 220 of FIG. 2 translates the binary representation of data received from host system 100 into programming voltages and periods. The programming circuit applies these programming voltages for the periods programming periods to memory cells to cause the memory cells to store electric charge. The amount of stored electric charge is representative of the binary representation of the received data.

Memory controller 118 and peripheral circuits 210 may utilize configuration information stored in memory 116 to operate the reading and peripheral circuits. In this example, configuration information may include voltage levels used to program the DACs to cause writing or erasing cells, etc. Additional configuration parameters may include trimming parameters such as reference voltage trimming, charge pump trimming, temperature trimming, bad block information and bad wordline information.

The XDL 224 functions as intermediate data storage between memory controller 106 and memory 108. When instructed by the host system 100 to write data to memory 108, memory controller 106 writes data to XDL 224. The programming circuit 220 then writes the data from XDL 224 to the specified memory block and page. By way of example and without limitation, the size of the XDL is equal to the size of a page. Similarly, when instructed to read data from a specified memory page, reading circuit 218 reads data from the specified memory page into the XDL 224 and memory controller 106 transfers the read data from the XDL 224 to controller RAM 204.

In some forms, the memory controller 118 maintains a logical to physical address table in controller RAM 204. An entry in the table may include a reference to a memory page. One format of an entry in the table may comprise a reference to the memory block associated with the memory page and an index or offset into the memory block. Memory controller 118 may periodically store the logical to physical address table in one or more memory pages of memory 116. The stored logical to physical address table may be retrieved by memory controller 118 on a power on reset (POR) to reconstruct the manner in which data is organized and stored in the memory pages of memory 116

The host system 100 when requesting a write of data specifies a logical address. The request may be received via interface 228. Interface 228 may operate in accordance with any one of the previously listed communication protocols. In response to receiving a request from host system 100 to write data to a logical address, processor 202 may utilize the logical address as an index into the logical to physical address table and identify the memory page and the memory block corresponding to the logical address. The processor 202 may determine if the identified memory page is already written to (not erase). In response to determining that the memory page is not erased, processor 202 may locate a new memory page that has not been written to and write the received data to the new memory page. Separately, processor 202 may update the entry in the logical to physical address table corresponding to the logical address with a reference to the memory block associated with the new memory page.

In some forms, memory controller 118 may include an abstraction mechanism that separates the protocol specific aspects of the communication protocol from the internal operational mechanisms of the memory 116. By abstracting the protocol specific aspects from the functional aspects of memory 116, the operation of memory 116 may be decoupled from the communication protocol. Decoupling permits the internals of the non-volatile memory system 102 to operate in an optimal manner that optimizes its performance, according to the command ordering desired by the non-volatile memory system and in any way that complies with the configuration limitations of the device and its resources.

Typically when memory controller 118 is instructed by host system 100 to write data to memory 116, processor 202 may cause the ECC engine 214 to calculate an error correcting code (ECC) for the data. An example ECC is the low-density parity-check code (LDPC). The calculated ECC may be written to the memory page along with the data. Separately, ECC engine 214 may compute the ECC for data in a memory page whenever the data in the memory page is read out by memory controller 118. The memory controller 118 may read out the data from the memory page in response to receiving a request from host system 100. The ECC engine 214 may compare the computed ECC with the ECC that was stored in the memory page when the data was written to the page. Generally, if the number of bits in error or the bit error rate (BER) of the data of a memory page is below a threshold, the ECC engine 214 may utilize the ECC stored with the data to recover the bits in error and write the corrected data back to a new memory page.

Figure 3:
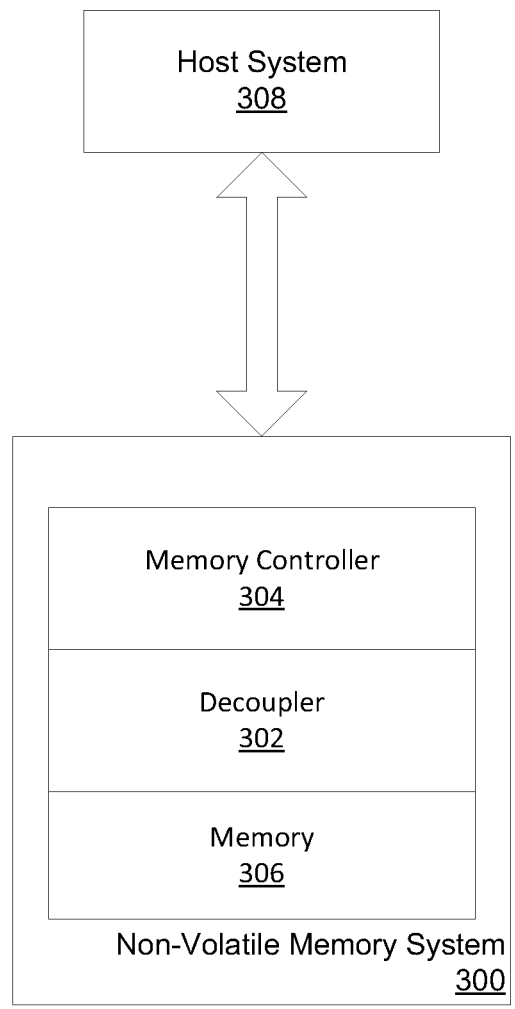
FIG. 3 is a block diagram of a host system and a non-volatile memory system that includes an exemplary decoupling module.

In some forms, decoupling is achieved by introducing a hardware and software layer between the memory controller 118 and the memory 116. FIG. 3 illustrates an exemplary non-volatile memory system 300 that includes an exemplary decoupler 302 provided between memory controller 304 and memory 306. Memory controller 304 may correspond to memory controller 118, in some implementations. Memory controller 304 may receive commands and data from the host system 308 via an interface. In some implementations, memory controller 304 may transmit the commands to the decoupler 302. Decoupler 302 may translate the protocol-specific commands into memory commands capable of being interpreted and executed by componentry of memory 306.

On completion of the memory commands, memory 306 may communicate status information and data to decoupler 302. Decoupler 302 may format the received status and data received from the memory 306 to comply with the communication protocol used between the host system 308 and the non-volatile memory system 300. The decoupler 302 may transmit the formatted data and status information to memory controller 304, which may in turn communicate the same to the host system 308.

Figure 4:
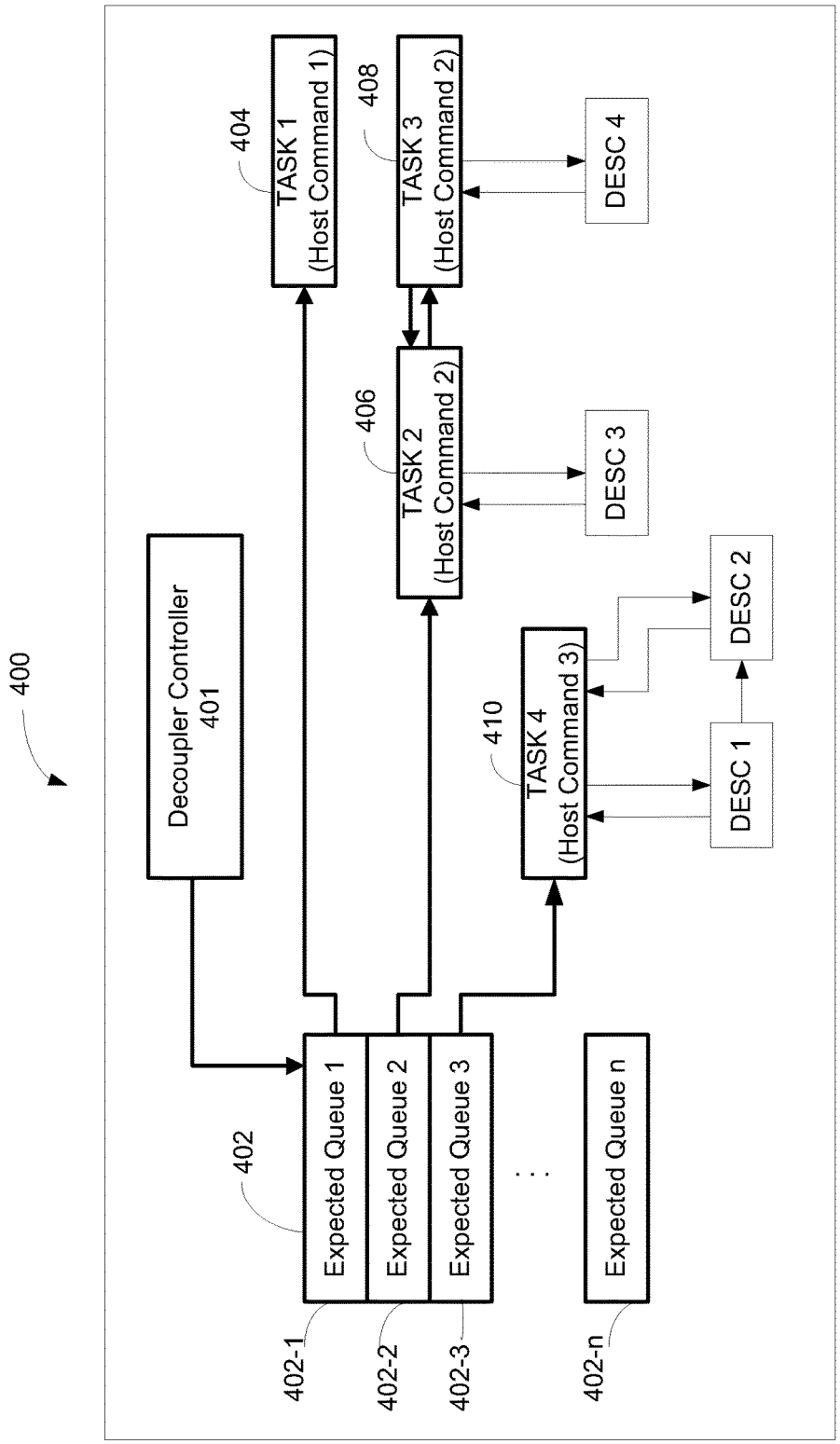
FIG. 4 is a block diagram of an example decoupling module.

FIG. 4 is a block diagram of an exemplary decoupler 400. Decoupler 400 may correspond to decoupler 302 of FIG. 3. Decoupler 400 comprises a decoupler controller 401 and a plurality of queues 402 (also referred to as an expected queues). In some forms, decoupler 400 may be implemented as software instructions stored in controller RAM 204 and executed by processor 202. In other forms, portions of the decoupler 400 may be implemented as hardware logic and other portions may be implemented as software objects. For example, the decoupler controller 401 may be implemented as an ASIC and queue 402 may be implemented as a software object such as an array or a linked list of structures in controller RAM 204.

In some implementations, decoupler controller 401 may be in communication with memory controller 304. In response to receiving a command from host system 308 to read or write data to memory 306, for example, memory controller 304 may communicate the host command to decoupler controller 401. In some implementations that utilize shared memory, the command may be stored in memory controller 304 and memory controller 304 may communicate a reference to decoupler controller 401.

Decoupler controller 401 may store a reference to the host command in an expected queue of the plurality of expected queues 402. Decoupler controller 401 may store host commands received from the host system 308 in the order in which they are received along with a priority of the host command. For example, if host command 1 is the first command received, decoupler controller 401 may store this host command in an entry of a first expected queue 402-1 of the plurality of expected queues 402. As previously explained, host command 1 may be formatted in accordance with the communication protocol and standard used between the host system 308 and the non-volatile memory system 300. Decoupler controller 401 may translate the host command into a generic format. For example, decoupler controller 401 may translate the host command into memory command primitives understandable by memory 306.

The decoupler controller 401 may instantiate one or more tasks before deconstructing the host command. For example, decoupler controller 401 may spawn task structure 404 in response to host command 1, spawn task structure 406 and task structure 408 in response to host command 2, and spawn task structure 410 in response to host command 3.

The decoupler controller 401 may generate descriptor structure 1 and descriptor structure 2 as a result of translating host command 3. Descriptors 1 and 2 may include information for two separate memory commands that when executed result in completion of host command 3.

In some forms, the memory controller 304 may perform tasks to execute memory commands corresponding to the host commands in an order which optimizes performance of the non-volatile memory system 300. For example, although host command 3 was received after host command 2, to optimize performance memory controller 304 may begin executing the memory command associated with descriptor 1 of task 4 first, followed by beginning to execute the memory command associated with descriptor 3 of task 2 for host command 2, and finally followed by starting to execute the memory command associated with descriptor 2 of task 4. However, the responses to the commands, data, or status, are communicated to the host system 308 in the order in which the host commands are received. In other forms, the host system 308 may specify the order in which the host commands are to be executed.

Tasks and descriptors that include the memory commands are positioned within an expected queue of the plurality of expected queues 402 to await execution by the memory controller 304. During operation, the decoupler controller 401 switches between queues of the plurality of expected queues to provide the memory commands to the memory controller 304 for execution. In some implementations, each of the expected queues 402 is associated with a priority such that memory commands in a higher priority expected queue are executed before memory commands in a lower priority expected queue.

In some forms, the host command received from the host system includes information that instructs which expected queue that memory commands associated with the host command should be placed. However, in other forms, the decoupler controller 401 and/or the memory controller 304 have discretion as to which expected queue to place the memory command.

When the memory controller 304 executes memory commands corresponding to the host commands in an order which optimizes performance of the memory 300, in some implementations the decoupler controller 401 may utilize the descriptors to indicate a command priority of the memory command with respect to other memory commands in an expected queue 402.

For example, the decoupler controller 401 may utilize the descriptor to identify a command priority of the memory command as a head command, an ordered command, or a simple command.

A head command is a memory command that should be placed at a head of an expected queue. As a result, the head command is given a high priority and the memory controller 304 will begin executing the memory command at a next available opportunity when the memory controller 304 executes commands from that particular expected queue.

An ordered command is a memory command that is placed at a rear of an expected queue. The decoupler controller 401 and/or memory controller 304 maintains the order in which the ordered command enters the expected queue such that the memory controller 304 will not begin to execute an ordered command in the expected queue until it has started executing all head commands in that expected queue and started executing any other ordered command that was placed in that expected queue prior to the ordered command.

A simple command is a memory command that is placed at the rear of an expected queue with a low priority. The memory controller 304 may begin executing a simple command at the discretion of the memory controller 304.

In some forms, the host command received from the host system includes information that instructs which command priority designation that memory commands associated with the host command should be given. However, in other forms, the memory controller 304 has discretion as to which priority designation to associate with a memory command.

In some implementations, when the decoupler controller 401 provides a group of memory commands to the memory controller 304 for execution, the decoupler controller 401 may utilize a group identifier (group id) in the descriptors to associate one or more memory commands with each other that have the same command priority level. For example, a decoupler controller 401 may associate a group of memory commands together that are all designed as head commands in the same expected queue. When the memory controller 304 reaches a point where it is able to execute one of the head commands of the group, the memory controller 304 has discretion as to which memory command within the group of head commands to begin executing.

In some forms, the group id is implemented as an integer such that the memory controller 304 may process through the group ids in numerical order. For example, the decoupler controller 401 may associate a first group of memory commands that are ordered commands with a group id of 10 and associated a second group of memory commands that are ordered command with a group id of 11. During operation, once the memory controller 304 has started executing all of the memory commands with a group id of 10, the memory controller 304 may proceed to begin executing one of the memory commands with a group id of 11.

While the above dictates the order in which the memory controller 304 begins to process tasks and execute associated memory commands, it will be appreciated that the memory controller 304 may complete the tasks at the discretion of the memory controller 304. For example, the memory controller 304 may start a first task before starting a second task. However, in order to increase efficiency or due to dependence on other tasks, for example, the memory controller 304 may complete the second task before completing the first task. In order to provide the host system responses to the memory commands in an order that the host system is expecting them in, the memory controller 304 utilizes the order of the host commands stored in the plurality of expected queues 402 to translate the completed tasks back into a format that the host system 308 is expecting, and to send the response to the executed host commands back to the host system 308 in an order that the host system is expecting.

Figure 5:
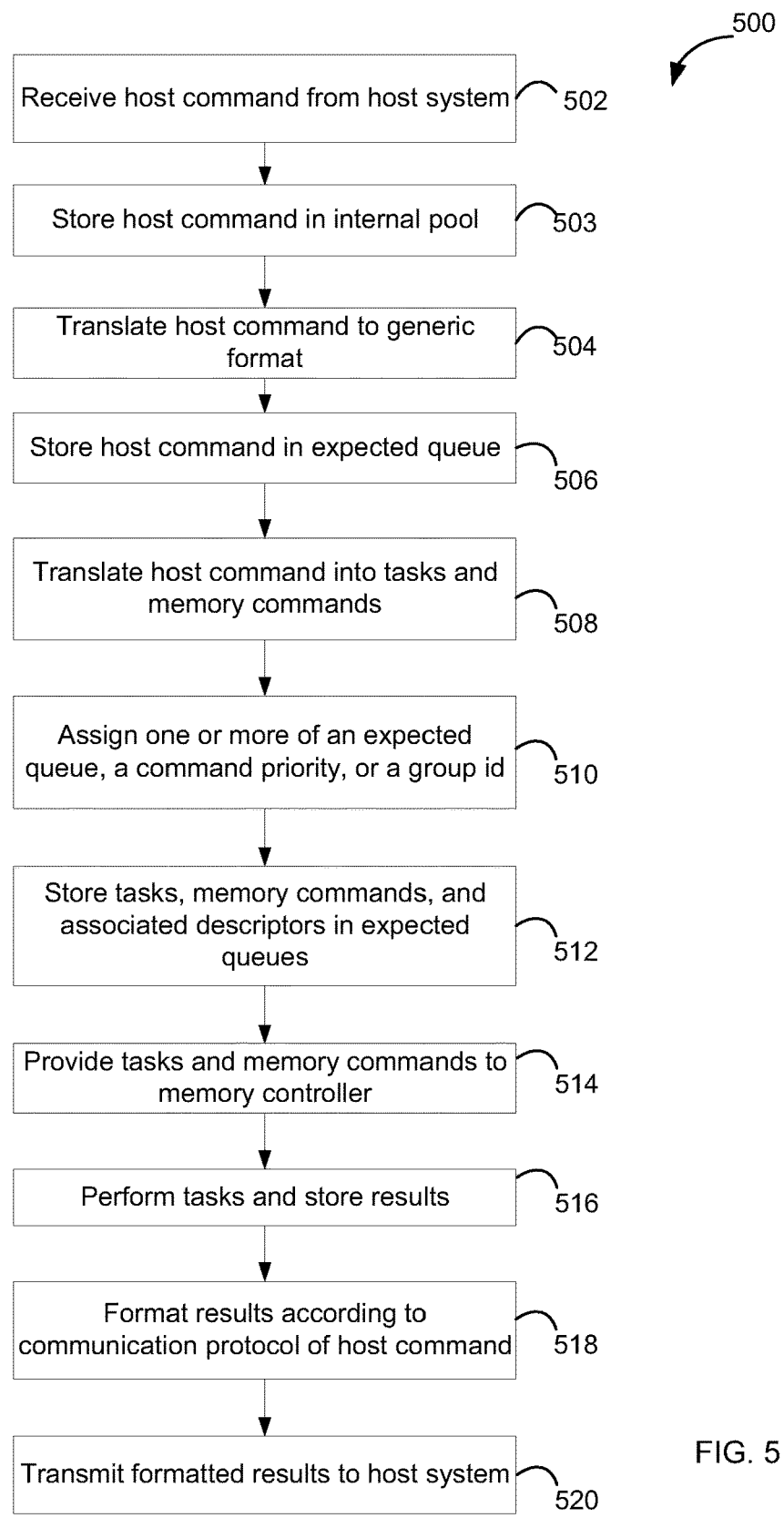
FIG. 5 is a flow chart of an example method implemented by an exemplary decoupling module to facilitate decoupling of the operation of a host and a storage device.

FIG. 5 is a flow chart of an exemplary method that may be implemented by a non-volatile memory system, for example, to decouple operations at the memory system from protocol specific details of a host command.

At block 502 a non-volatile memory system receives a host command from a host system. The received host command has a command structure that includes command attributes and other parameters. In some forms, the command attributes and parameters are in accordance with a format that complies with a communication protocol, the SATA protocol for example, that is operative between the host system and the non-volatile memory system.

In some implementations, at block 503, the non-volatile memory system may temporarily store the received host command in an internal pool until the non-volatile memory system is prepared to translate the received host command.

At block 504, a decoupler controller may translate the received host command from its protocol specific format to a general format structure. For example, if the received host command is an instruction to write 2000 bytes of data to a specified logical block address and if the size of a memory page of memory is 512 bytes, the decoupler may translate the single write host command to four memory page writes.

At block 506, the decoupler controller stores the received host command or a reference to the received host command in an entry of an expected queue.

At block 508, the decoupler controller may also translate the received command into tasks and associated memory commands. The task may be a software object created by a real-time operating system executed by the memory controller or the decoupler. In some forms, the translated memory commands may be stored in descriptors. The descriptors may store command attributes and other command information translated to the memory command format.

At block 510, the decoupler controller may also assign one or more of an an expected queue, a command priority, and a group id to the tasks and associated memory commands. In some implementations, the host command includes instructions on which expected queue, command priority, and/or group id to assign to the tasks and associated memory commands. However, in other implementations, the decoupler controller assigns one or more of an expected queue, a command priority, and a group id to the tasks and associated memory commands at the discretion of the decoupler controller.

At block 512, the decoupler stores the tasks, associated memory commands, and associated descriptors in one or more expected queues. At block 514, the decoupler provides tasks and memory commands to the memory controller based on a priority of an expected queue and a command priority of the tasks and memory commands, as explained in more detail below in conjunction with FIG. 6.

At block 516, the memory controller performs the tasks and associated memory commands based on their priority, and stores the result of performing the tasks and executing the memory commands.

In some implementations, the memory controller and/or the decoupler stores the result of performing the tasks and executing the memory commands in the expected queue entry associated with the related task and/or memory command that was originally send to the memory controller at block 512.

At block 518, decoupler controller may convert the results of performing the tasks and executing the host command into a format corresponding to the standard of the communication protocol used to communicate information between the host system and the non-volatile memory system.

At block 520, the formatted results may be transmitted back to the host system. In some implementations, the results may be transmitted back to the host system in the order in which the host commands were received. Thus, even if the memory controller completes executing a later received host command before an earlier received host command, the result of executing the earlier received host command will be communicated first back to the host system.

Figure 6:
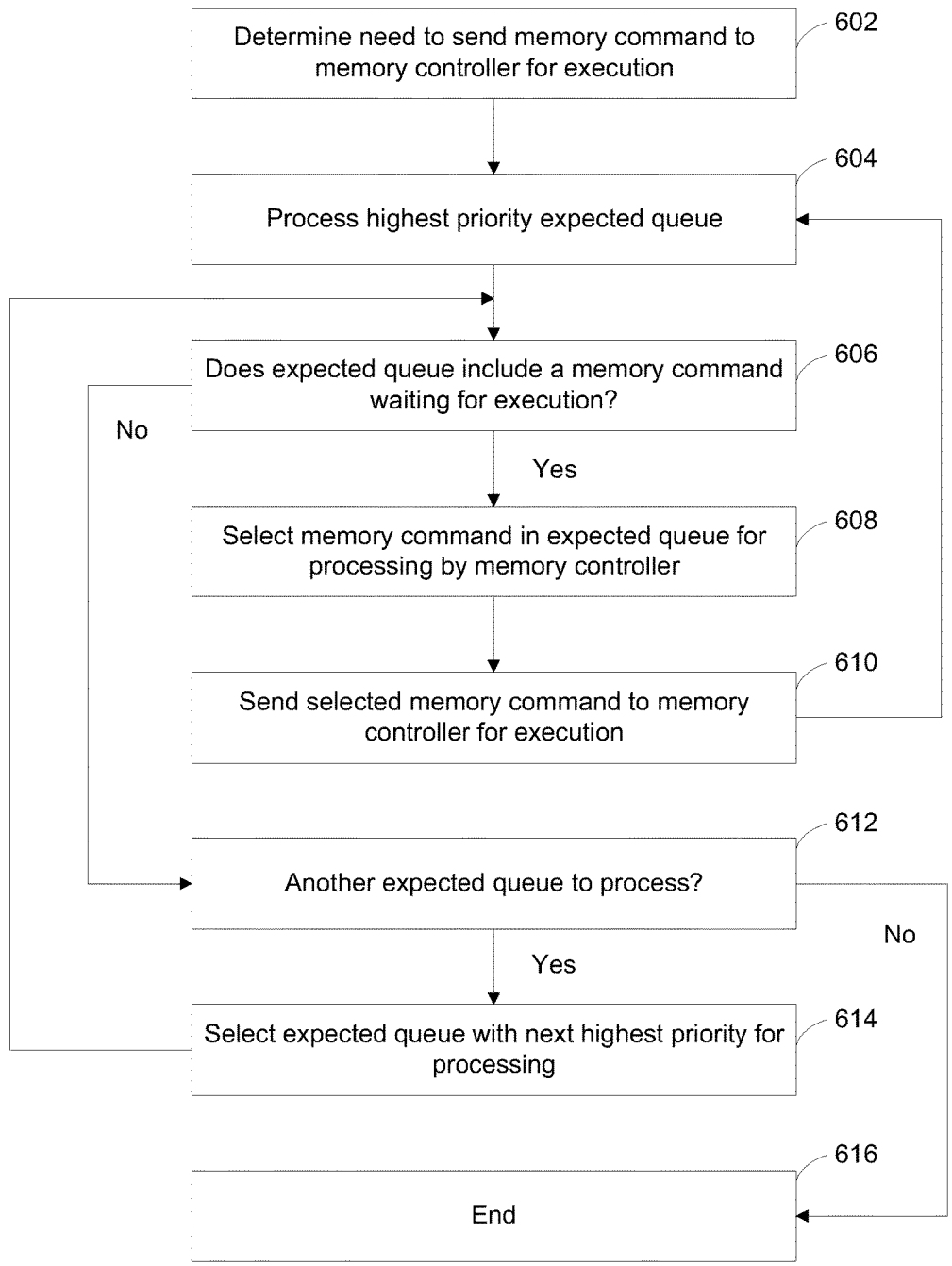
FIG. 6 is a flow chart of an example method for a decoupler to provide memory commands in expected queues to a memory controller for execution.

FIG. 6 is a flow chart of an example method for a decoupler to provide memory commands in expected queues to a memory controller for execution. At block 602, the decoupler controller determines a need to send a memory command to the memory controller for execution.

At block 604, the decoupler controller proceeds to determine whether an expected queue of a plurality of expected queues with a highest priority is storing one or more memory commands waiting for execution.

At block 606, the decoupler controller determines whether the expected queue is storing one or more memory commands waiting for execution. When the expected queue is storing one or more commands waiting for execution, the decoupler controller selects a memory command to send to the memory controller for execution at block 608.

When the expected queue includes multiple memory commands waiting for execution, the decoupler controller may select a memory command for execution based on factors such as a command priority associated with the various memory commands and a time when each of the memory commands were stored in the expected queue.

For example, if a memory command that has been designated as a head command is stored in the expected queue, the decoupler controller will select the memory command that has been designated as a head command to the memory controller for execution. If the expected queue is storing multiple memory commands that are designated as head commands, the decoupler controller may select the memory command that has been designated as a head command that has been in the expected queue for the most amount of time.

In another example, when the expected queue is not storing a memory command that is designated as a head command, the decoupler controller may check for memory commands in the expected queue that are designated as an ordered command. When the expected queue is storing one or more memory commands designated as an ordered command, the decoupler controller may select the memory command that has been designated as an ordered command that has been in the expected queue for the most amount of time.

After selecting the memory command to send to the memory controller, the decoupler controller sends the memory command to the memory controller for execution at block 610. After sending the memory command to the memory controller, the method loops to block 604 and the above described process is repeated.

Referring again to block 606, when the decoupler controller alternatively determines that the expected queue is not storing one or more memory commands waiting for execution, the decoupler controller proceeds to determine at block 612 whether there is an expected queue that has not been processed.

When there is an expected queue that has not been processed, the decoupler controller selects an expected queue with the next highest priority for processing at block 614. The method then loops to block 606 and the decoupler controller determines whether the expected queue with the next highest priority is storing one or more memory commands waiting for execution and the above described process is repeated.

Referring again to block 612, when the decoupler controller alternatively determines that all the expected queues have been processed, the method ends at block 616

It will be appreciated that in the method described above in conjunction with FIG. 6, the decoupler controller proceeds to step through each expected queue of a plurality of expected queues in order of priority looking for memory commands to send to the memory controller for execution. When an expected queue is identified that is storing one or more memory commands for execution, the decoupler controller utilizes information such as the memory command priorities of the memory commands in determining which memory commands to select to send to the memory controller for execution. Additionally, after a memory command is sent to the memory controller for execution, the decoupler controller starts the process over beginning with the highest priority expected queue in case memory commands are added to a higher priority expected queue during processing.

An example of processing host commands using the methods described above in conjunction with FIGS. 5 and 6 is shown in Table 1.

TABLE 1

Example

| Line | Receive from Host | Send to Memory Controller (MC) | Receive from Memory Controller | Send to Host |
|---|---|---|---|---|
| 1 | Read command: SIMPLE, 4 KB, queue #1, ID = 1 | — | — | — |
| 2 | — | Command (ID = 1) is translated, added to expected queue and delivered to MC | — | — |
| 3 | Read command: SIMPLE, 8 KB, queue#2, ID = 2 | — | — | — |
| 4 | Read command: ORDERED, 4 KB, queue #1, ID = 3 | Command (ID = 2) is translated, added to expected queue and delivered to MC | — | — |
| 5 | — | Command (ID = 3) is translated, added to expected queue and delivered to MC | MC send 4 KB data for ID = 2. Information is appended to ID = 2 in the expected queue | — |
| 6 | — | — | MC send 4 KB data for ID = 3. Information is appended to ID = 3 in the queue | Data for ID = 2 is delivered to host. Related information is removed from the queue |
| 7 | — | — | MC send 4 Kb data for ID = 2. Information is appended to ID = 2 in the queue | — |
| 8 | — | — | MC send 4 KB data for ID = 1. Information is appended to ID = 1 in the queue | data for ID = 2 is delivered to the host. Related information is removed from the queue |
| 9 | — | — | MC send complete message for ID = 3. Information is appended to ID = 3 in the queue | data for ID = 1 is delivered to the host. Related information is removed from the queue |
| 10 | — | — | MC send complete message for 2. Information is appended to ID = 2 in the queue | — |
| 11 | — | — | MC send complete message for ID = 1. Information is appended to ID = 1 in the queue | Complete message for ID = 2 is delivered to the host. Command with ID = 2 is removed for the expected queue |
| 12 | — | — | — | Complete message for ID = 1 is delivered to the host. Command with ID = 1 is removed from the expected queue |

TABLE 1-continued

| | | Example | | |
|---|---|---|---|---|
| Line | Receive from Host | Send to Memory Controller (MC) | Receive from Memory Controller | Send to Host |
| 13 | — | — | — | data for ID = 3 is delivered to the host. Related information is removed from the queue |
| 14 | — | — | — | Complete message for ID = 3 is delivered to the host. Command with ID = 3 is removed from the expected queue |

In the example, the non-volatile memory system receives a 4 KB read command from a host system coupled with the non-volatile memory system. A decoupler of the non-volatile memory system identifies the read command as having a command priority of simple command, as being associated with a first expected queue of a plurality of expected queues, and as having a group identifier of one. The decoupler translates the read command to a generic format as described above and stores the memory command and associated tasks in the first expected queue before later sending the translated commands to the memory controller for execution as described in conjunction with FIG. 6.

The non-volatile memory system later receives a 8 KB read command from the host system. The decoupler identifies the read command as having a command priority of a simple command, as being associated with a second expected queue of the plurality of expected queues and as having a group identifier of two. The decoupler translates the read command to a generic format and stores the memory command and associated tasks in the second expected queue before later sending the translated commands to the memory controller for execution.

While adding the second read command to the second expected queue and later sending the translated command to the memory controller for execution, the non-volatile memory system receives a third read command from the host system. The read command is 4 KB and the decoupler identifies the read command as having a command priority of ordered, as being associated with a first expected queue of the plurality of expected queues, and as having a group identifier of three.

The decoupler translates the third read command into a generic format and stores the memory command and associated tasks in the first expected queue before later sending the translated command to the memory controller for execution.

As the decoupler sends the translated commands for the third read command to the memory controller for execution, the memory controller stores 4 KB of data in the second expected queue that the memory controller obtained when executing at least a portion of the tasks and memory commands associated with group identifier two.

The memory controller additionally stores 4 KB of data in the third expected queue that the memory controller obtained when executing at least a portion of the tasks and memory commands associated with group identifier three.

As the memory controller stores this data, the decoupler may in parallel format according to a communication protocol of the host system the data stored in the data stored previously stored in the second expected queue and send the formatted data to the host system.

Continuing with line 7 in Table 1, it will be appreciated that the memory controller continues to execute the memory commands and tasks, and to store the result in the expected queues. Further, as the memory controller stores the data in the expected queues, the decoupler translates the data into the host system protocol and sends the information to the host system.

FIGS. 1-6 illustrate non-volatile memory systems that provide the ability to decouple host commands and translate the host commands into more simplistic memory commands that the memory system can more easily execute. As discussed above, the non-volatile memory system utilizes expected queues, command priorities, and group ids in order to execute memory commands that are based on host commands in a manner that is efficient to the non-volatile memory system. However, the non-volatile memory system is able to provide responses to host commands to a host system in a manner and order in which the host system is expecting them.

It is intended that the foregoing detailed description be regarded as illustrative rather than limiting, and that it be understood that it is the following claims, including all equivalents, that are intended to define the spirit and scope of this invention.

For example, in the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

I claim:
1. A method comprising:
with a decoupler controller of a non-volatile memory system:
receiving a host command;
translating the host command, which is formatted in accordance with a protocol that may not be processed by a memory controller, into a plurality of memory commands, where each memory command of the plurality of memory commands is in a general format structure that may be processed by the memory controller;

for each memory command of the plurality of memory commands, determining a command priority of the memory command in an expected queue of a plurality of expected queues;

selecting a first memory command of the plurality of memory commands for execution by the memory controller, wherein the decoupler controller selects the first memory command from among other memory commands in a first expected queue of the plurality of expected queues based on the command priority of the first memory command and a priority of the first expected queue;

after selecting the first memory command for execution, selecting a second memory command of the plurality of memory commands for execution by the memory controller, wherein the decoupler controller selects the second memory command from among other memory commands in a second expected queue of the plurality of expected queues based on the command priority of the second memory command and a priority of the second expected queue;

receiving a result of an execution of the second memory command prior to receiving a result of an execution of the first memory command;

refraining to transmit the result of the execution of the second memory command to a host system until the result of the execution of the first memory command is received;

translating the result of the execution of the first memory command and the result of the execution of the second memory command into a formatted host command result based on a format of the protocol of the received host command; and transmitting the formatted host command result to the host system.

2. The method of claim 1, further comprising:
with the decoupler controller, for each memory command of the plurality of memory commands:
storing the command priority of the memory command in a descriptor associated with the memory command; and
storing the memory command and the descriptor in the expected queue.

3. The method of claim 1, wherein the decoupler controller determines the command priority based on instructions from the host system included in the host command.

4. The method of claim 1, wherein the command priority of the first memory command indicates that the first memory command is a simple command, and
wherein the method further comprises:
placing the first memory command at a tail of the expected queue based on the memory command being a simple command.

5. The method of claim 1, wherein the command priority of the first memory command indicates that the first memory command is an ordered command, and
wherein the method further comprises:
placing the first memory command at a tail of the expected queue based on the memory command being an ordered command.

6. The method of claim 1, wherein the command priority of the first memory command indicates that the first memory command is a head command, and
wherein the method further comprises:
placing the first memory command at a head of the expected queue based on the memory command being a head command.

7. The method of claim 1, further comprising:
storing the host command in the expected queue prior to translating the host command into the plurality of memory commands;
wherein the decoupler controller transmits the formatted host command result to the host system based on a position of the host command within the expected queue.

8. A non-volatile memory system comprising:
a non-volatile memory; and
a controller in communication with the non-volatile memory, the controller configured to:
translate a first command that is formatted according to a communication protocol into at least a second command and a third command that are formatted generically;
store the first command in an expected queue;
store the second command in the expected queue with a command priority;
store the third command in the expected queue with a command priority;
select the second command for execution from among other commands in the expected queue based on the command priority of the second command;
after selecting the second command for execution, select the third command for execution from among other commands in the expected queue based on the command priority of the third command;
receive a result of an execution of the third command prior to receipt of a result of an execution of the second command;
refrain from transmitting to a host system the result of the execution of the third command until the result of the execution of the second command is received;
translate the result of the execution of the second command and the result of the execution of the third command into a format according to the communication protocol; and
transmit the result of the execution of the second command and the result of the execution of the third command in the format according to the communication protocol to the host system dependent upon a position of the first command in the expected queue.

9. The non-volatile memory system of claim 8, wherein the controller is further configured to:
select the expected queue from a plurality of expected queues to store the first command, the second command, and the third command based on a priority of the first command;
wherein to select the second command for execution, the controller is configured to select the second command for execution based on a priority of the expected queue and the command priority of the second command; and
wherein to select the third command for execution, the controller is configured to select the third command for execution based on the priority of the expected queue and the command priority of the third command.

10. A method comprising:
with a decoupler controller of a non-volatile memory system:
receiving a host command;
translating the host command into at least a first memory command and a second memory command;

determining a command priority in a first expected queue of a plurality of expected queues for the first memory command and determining a command priority in the first expected queue for the second memory command;

assigning a group id to the first memory command and the second memory command based on the command priority of the first memory command and the command priority of the second memory command being the same command priority;

selecting the first memory command for execution by a memory controller based on a priority of the first expected queue and the command priority of the first memory command;

after selecting the first memory command for execution, selecting the second memory command for execution by the memory controller based on the priority of the first expected queue and the command priority of the second memory command;

after selecting the first and second memory commands for execution and determining that the first and second memory commands are assigned to the same group id, allowing the memory controller to determine whether to begin executing the first memory command or the second memory first in order to increase performance of the non-volatile memory system;

receiving a result of an execution of the second memory command prior to receiving a result of an execution of the first memory command;

refraining to transmit the result of the execution of the second memory command to a host system until the result of the execution of the first memory command is received;

translating the result of the execution of the first memory command and the result of the execution of the second memory command into a formatted host command based on a format of the host command; and transmitting the formatted host command to the host system.

11. The method of claim 10, wherein the host command is formatted according to a communication protocol, and wherein the first memory command and the second memory command are formatted generically.

12. The method of claim 10, further comprising:
storing the host command in the first expected queue;
wherein the formatted host command is transmitted to the host system based on a position of the host command in the first expected queue.

13. The method of claim 10, further comprising:
receiving, from the host system, a subsequent host command after receiving the host command;
translating the subsequent host command into a third memory command;
executing the third memory command prior to executing the first memory command and the second memory command; and refraining from transmitting a result of the execution of the third memory command to the host system until after the formatted host command is transmitted to the host system.

14. The method of claim 13, further comprising:
determining a command priority in the first expected queue for the third memory command; and
assigning the group id to the third memory command in response to determining that the command priority of the first memory command, the second memory command, and the third memory command are the same.

15. The method of claim 14, further comprising:
storing the group id in a descriptor associated with the first memory command; and
storing the descriptor in the first expected queue.

16. The method of claim 14, wherein the group id is an integer.

17. The method of claim 10, wherein the command priority of the first memory command and the command priority of the second memory commands are determined based on instructions from the host system included in the host command.

18. A non-volatile memory system comprising:
a non-volatile memory;
means for translating a first command that is formatted according to a communication protocol into at least a second command and a third command that are formatted generically;
means for storing the first command in an expected queue;
means for storing the second command in the expected queue with a command priority;
means for storing the third command in the expected queue with a command priority;
means for selecting the second command for execution from among other commands in the expected queue based on the command priority of the second command;
means for selecting, after the selection of the second command for execution, the third command for execution from among other commands in the expected queue based on the command priority of the third command;
means for receiving a result of an execution of the third command prior to receipt of a result of an execution of the second command;
means for refraining to transmit the result of the execution of the third command to a host system until the result of the execution of the second command is received;
means for translating the result of the executed second command and the result of the executed third command into a format according to the communication protocol; and
means for transmitting to the host system the result of the executed second command and the result of the executed third command in the format according to the communication protocol dependent upon a position of the first command in the expected queue.

* * * * *